US 6,634,848 B2

(12) United States Patent
Henderson

(10) Patent No.: US 6,634,848 B2
(45) Date of Patent: Oct. 21, 2003

(54) AUTOMOTIVE STOWABLE RAMP DEVICE

(75) Inventor: Jack V. Henderson, West Bloomfield, MI (US)

(73) Assignee: Decoma International Inc., Concord (CA)

(*) Notice: Subject to any disclaimer, the term of this patent is extended or adjusted under 35 U.S.C. 154(b) by 0 days.

(21) Appl. No.: 10/045,687

(22) Filed: Oct. 29, 2001

(65) Prior Publication Data

US 2002/0098071 A1 Jul. 25, 2002

Related U.S. Application Data

(60) Provisional application No. 60/245,434, filed on Nov. 2, 2000.

(51) Int. Cl.[7] .................................................. B60P 1/43
(52) U.S. Cl. ........................ 414/537; 296/61; 14/71.1
(58) Field of Search ........................ 414/537, 538; 14/69.5, 71.1, 71.3; 296/61

(56) References Cited

U.S. PATENT DOCUMENTS

| 3,642,156 A | 2/1972 | Stenson |
| 4,864,673 A | 9/1989 | Adaway et al. |
| 5,211,437 A | 5/1993 | Gerulf |
| 5,244,335 A | 9/1993 | Johns |
| 5,273,335 A | 12/1993 | Belnap et al. |
| 5,342,105 A | 8/1994 | Miles |
| 5,518,288 A | 5/1996 | Deklotz |
| 5,540,474 A | 7/1996 | Holland |
| 5,597,195 A | 1/1997 | Meek |
| 5,803,523 A | 9/1998 | Clark et al. |
| 5,988,725 A * | 11/1999 | Cole ........................ 296/61 |
| 6,120,081 A * | 9/2000 | Collins ..................... 296/61 |
| 6,139,249 A * | 10/2000 | Lucht ...................... 414/537 |
| 6,250,874 B1 * | 6/2001 | Cross ....................... 414/537 |

* cited by examiner

Primary Examiner—James W. Keenan
(74) Attorney, Agent, or Firm—Clark Hill PLC

(57) ABSTRACT

A vehicle comprises a passenger cab and a pickup truck cargo bed that extends outward from the passenger cab. The cargo bed comprises two opposing sidewalls, a front wall and a movable rear tailgate. A ramp assembly comprises panels, hinges, retainer brackets, and stiffeners and is stored in the cargo bed. The hinges rotatably interconnect the panels to each other and a single panel to the tailgate. The stiffeners reinforce the panels when in use and are otherwise stowed in the cargo bed. The retainer bracket holds the panels against the tailgate when in the stowed position.

8 Claims, 2 Drawing Sheets

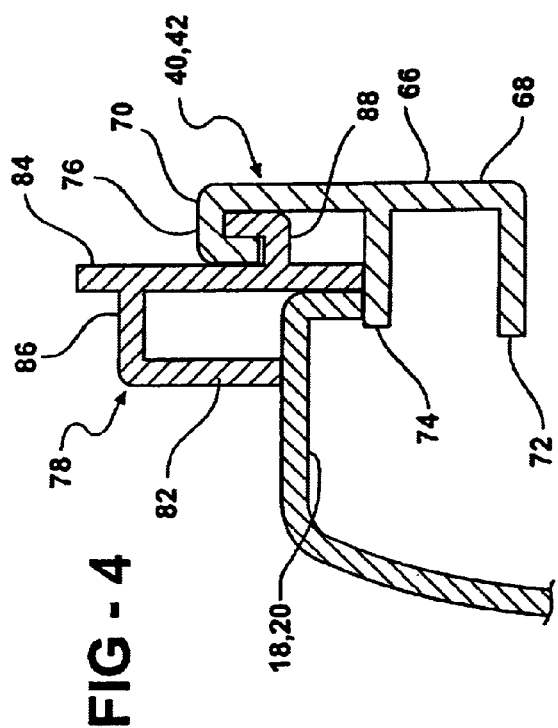
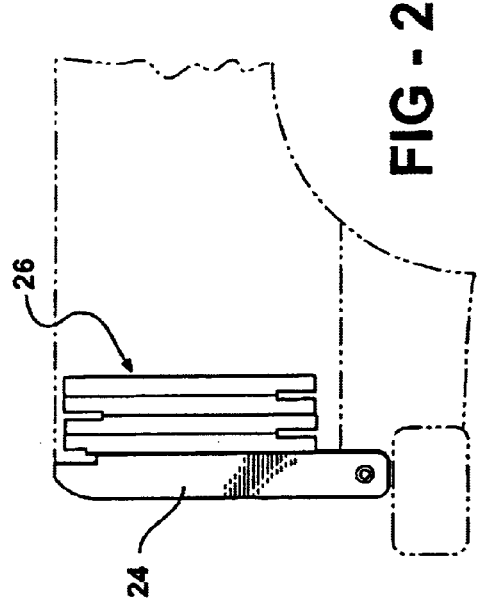
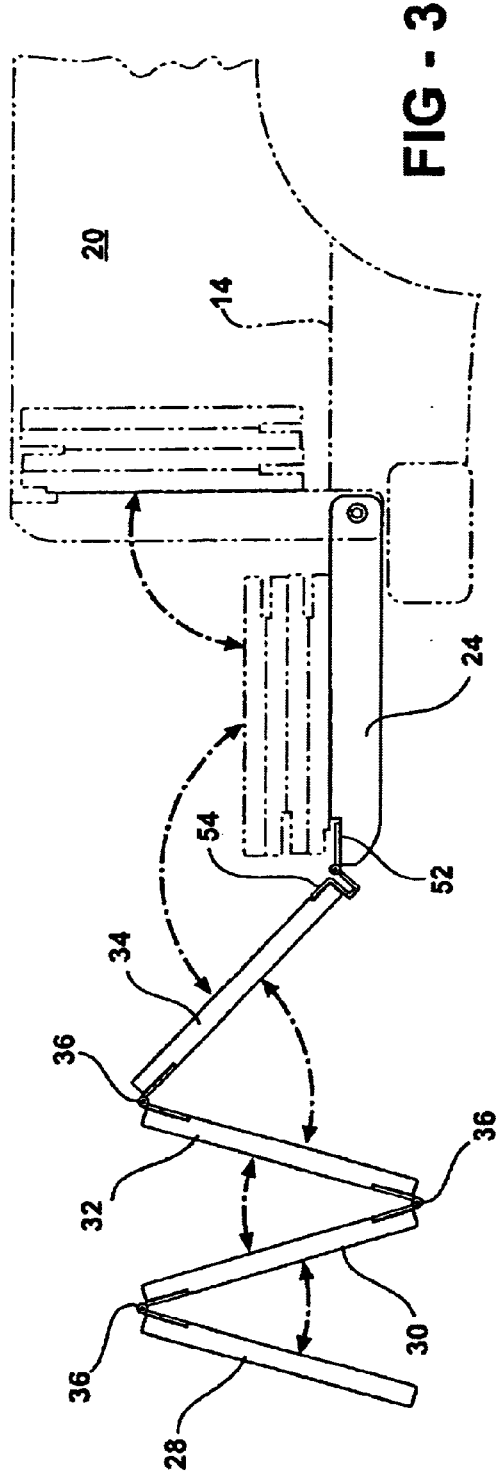

AUTOMOTIVE STOWABLE RAMP DEVICE

This application claims priority to and all the benefits of U.S. Provisional Patent Application No. 60/245,434 filed on Nov. 2, 2000 and entitled "Automotive Stowable Ramp Device".

FIELD OF THE INVENTION

This invention relates to a multi-panel ramp assembly. In particular, this invention relates to a multi-panel ramp assembly for a pickup truck that is easily stowable on the tailgate when not in use.

BACKGROUND OF INVENTION

Pickup trucks are known for versatility in cargo carrying capacity. Pickups trucks typically include a cargo bed for receiving and storing cargo and a liftgate allowing access to the cargo bed. It can be very difficult, due to a high floor height of the cargo bed, to load a pickup truck when the cargo is bulky and/or heavy, such as refrigerators, stoves, all terrain vehicles (ATVs), and the like. Ramps extending between the cargo bed and the ground may be utilized to facilitate loading of large items into the cargo bed. A foldable ramp may be integrated into the liftgate and extendable from the liftgate to the ground. An example of such a foldable ramp is disclosed in U.S. Pat. No. 5,597,195 issued on Jan. 28, 1997 to Meek. However, foldable ramps, as disclosed in this patent, are not easily integrated into conventional liftgate designs due to the bulk and weight of such foldable ramps.

Therefore, it would be beneficial if a stowable ramp could be integrated into a more conventional liftgate design to be moveable between a folded position for movement with the liftgate and an extended position to facilitate loading of cargo into the cargo bed.

SUMMARY OF THE INVENTION

According to one aspect of the invention there is provided a stowable ramp assembly for a vehicle having a storage area having spaced apart sidewalls and a liftgate extending therebetween. The stowable ramp assembly includes a plurality of panels extending between the liftgate and the ground. Each of the plurality of panels extends between first and second terminal ends and longitudinal sides. The stowable ramp assembly further includes a plurality of stiffener rails engagable with the first and second terminal ends preventing relative motion between the plurality of panels.

DESCRIPTION OF THE DRAWINGS

Advantages of the invention will be readily appreciated as the same becomes better understood by reference to the following detailed description when considered in connection with the accompanying drawings, wherein:

FIG. 2 is a side view of the stowable ramp in the stowed position;

FIG. 3 is a side schematic view of the stowable ramp while opening; and

FIG. 4 is a cross sectional view of a stiffener for the stowable ramp.

DESCRIPTION OF THE INVENTION

Figure 1:
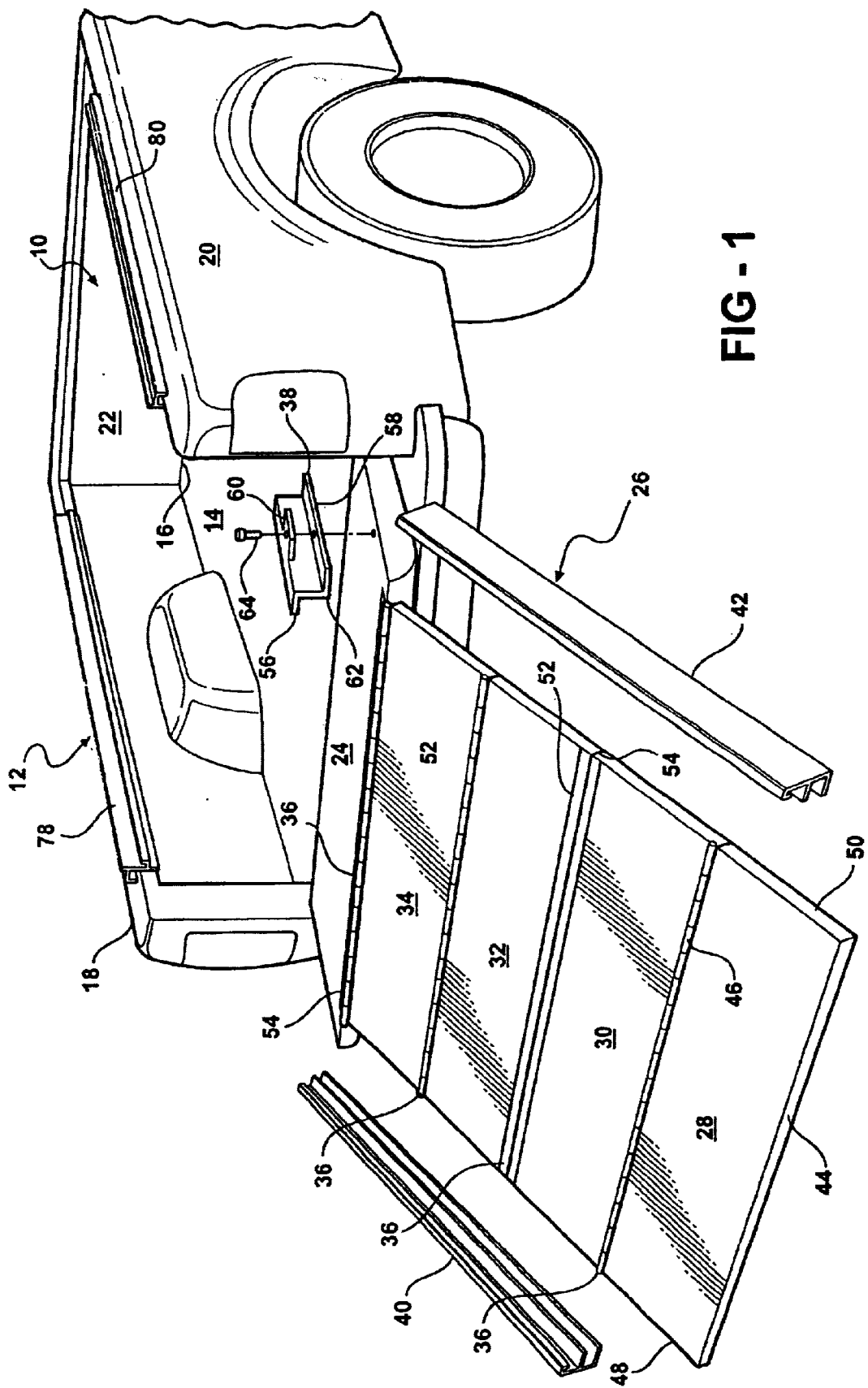
FIG. 1 is a partially exploded perspective view of a pickup truck cargo bed with the stowable ramp of the present invention in the extended planar use position.

Referring to FIG. 1, the cargo bed 10 of a pickup truck 12 is generally shown. The cargo bed 10 includes a generally planar floor 14 defined by a perimeter edge 16. Two opposing, generally parallel sidewalls 18, 20 are interconnected to the floor 14 and extend upwardly from the perimeter edge 16. The sidewalls 18, 20 and the floor 14 are further interconnected by a front wall 22 and a movable rear tailgate 24. The rear tailgate 24 acts as a storage area for a stowable ramp assembly 26 of the invention, when not in use.

The ramp assembly 26 includes panels 28, 30, 32, 34, a plurality of hinges 36, a retainer bracket 38, and stiffeners 40, 42. The panels 28, 30, 32, 34 are similar in design and function. Therefore, only panel 28 will be described. The panel 28 is generally planar and rectangular in shape having first 44 and second 46 terminal ends, and longitudinal sides 48, 50. The panels 28, 30, 32, 34 are formed from any suitable material such as glass reinforced polypropylene, glass reinforced urethane, or metal, so long as to withstand required loading characteristics. Furthermore, the panels 28, 30, 32, 34 may have textured surfaces for adding traction while in use.

Hinges 36 interconnect panels 28, 30, 32 and 34. The hinges 36 can be of any type of hinge mechanism, i.e., multiple hinge, piano hinge, or similar, as known to one of ordinary skill in the art. The hinges 36 include a first attachment bracket 52 and a second attachment bracket 54 which are pivotally connected together. The hinges 36 allow panels 28, 30, 32, 34 to fold on top of one another, as shown in FIG. 2. The last panel 34 is further connected to the tailgate 24 by way of a stowable hinge 36 having first and second attachment brackets 52, 54.

A ramp retainer bracket 38 is generally S-shaped and includes first and second generally horizontal planar shelves 56, 58 interconnected by a generally vertical planar member 60. Further, the ramp retainer bracket 38 has a hole 62 that accepts a threaded retainer 64 for holding the ramp retainer bracket 38 against the tailgate 24. The threaded retainer 64 may be any removable hold down device such as, a bolt or a quick release mechanism for holding the ramp retainer bracket 38 to the tailgate 24. It should be noted that more than one ramp retainer bracket 38 may be used in this invention.

The stiffeners 40, 42 are generally C-shaped in cross section, as shown in FIG. 4, and are of a length to cover and surpass the interconnection of the hinges 36 to each panel 28, 30, 32, 34 for reinforcement of the hinges 36. The stiffeners 40, 42 have a hooked or J-shaped flange 76 extending out therefrom. The stiffeners 40, 42 include a generally vertical wall 66 extending from a first end 68 to a distal second end 70. The first end 68 of the wall 66 has a generally perpendicular flange 72 that protrudes therefrom. A similar flange 74 extends perpendicular from the wall 66 intermediate of the first and second ends 68, 70. The second end 70 includes the J-shaped flange 76 that extends in the same direction as the flanges 72, 74.

Further, in the preferred embodiment, sidewall brackets 78, 80 are secured to the sidewalls 18, 20, respectively, of the cargo bed 10 as shown in FIG. 1. As shown in FIG. 4, each of the sidewall brackets 78, 80 includes two generally vertical walls 82, 84 interconnected by a generally horizontal wall 86 creating a generally J-shaped bracket. The larger of the walls 84 is positioned on the inside of the cargo bed 10, i.e., between the sidewalls 18, 20. Furthermore, the wall 84 has an L-shaped flange 88 which is further extending toward the inside of the cargo bed 10 and is upwardly facing for receiving the J-shaped flange 76 of the stiffeners 40, 42, thus storing on either sidewall 18, 20.

In operation, referring to FIG. 2, the tailgate 24 is shown in the closed position between the sidewalls 18, 20 of the cargo bed 10. The ramp assembly 26 is shown in a stowed position retained against the tailgate 24 within the cargo bed 10. To deploy the ramp assembly 26, the tailgate 24 is pivoted from the closed position, FIG. 2, to an open position, as shown in FIGS. 1 and 3, extending generally planar from the cargo bed floor 14. The retainer bracket 38 retains the ramp assembly 26 in the stowed position. That is, with the ramp assembly 26 folded in the stowed position against the tailgate 24, the bracket 38 retains the ramp assembly 26 between the shelf 56 and the tailgate 24. The threaded retainer 64 may be removed from the bracket 38 to disconnect the bracket 38 from the tailgate 24 and release the ramp assembly 26. The panels 28, 30, 32, 34 may now be unfolded or pivoted by the hinges 36 as shown in FIG. 3 from the stowed position against the tailgate 24 to the deployed or extended planar use position as shown in FIG. 1.

Finally, the stiffeners 40, 42 may be removed from the sidewall brackets 78, 80 and engaged along the opposing side edges 48, 50 of the panels 28, 30, 32, 34. Specifically, the flanges 72, 74 of the stiffeners 40, 42 are placed over the side edges 48, 50 of the panels 28, 30, 32, 34 and across each hinge 36 interconnecting the panels 28, 30, 32, 34 to form a single rigid panel for use as a ramp between the tailgate 74 and the ground or other surface adjacent the tailgate 24. When the ramp assembly 26 is in the stowed position, the stiffeners 40, 42 may be stowed within the truck bed 12 by the sidewall brackets 78, 80. Specifically, the J-shaped flange 76 of the stiffeners 40, 42 is hooked over the L-shaped flange 88 of the respective sidewall bracket 78, 80 for support thereon along the sidewalls 18, 20 of the bed 12.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

I claim:

1. A stowable ramp assembly for a vehicle having a storage area defined by spaced apart and generally parallel sidewalls and a tailgate extending therebetween, said stowable ramp assembly comprising:

a plurality of panels adapted to be extended from the tailgate, each of said plurality of panels extending between opposite first and second terminal ends and spaced apart, parallel longitudinal sides;

a plurality of hinges interconnecting adjacent terminal ends of said plurality of panels for providing hinged motion therebetween wherein said panels are collapsible onto each other to a stowed position against the tailgate; and a plurality of stiffener rails having a C-shaped cross-section engagaole around said longitudinal sides of each of said panels for preventing relative motion between said plurality of panels.

2. A stowable ramp assembly as set forth in claim 1 including a stowable hinge for hingedly securing one of said plurality of panels to the tailgate.

3. A stowable ramp assembly as set forth in claim 2 wherein each of said stiffener rails include a vertical wall, a first flange extending perpendicular from said vertical wall and a second flange spaced from said first flange and extending perpendicular from said vertical wall to define said C-shaped cross-section, and a hooked J-shaped flange extending from said vertical wall perpendicular to said flanges for supporting said stiffeners along the sidewalls of the storage area.

4. A stowable ramp assembly as set forth in claim 3 including a ramp retainer bracket removably mounted to the tailgate for engaging and maintaining said plurality of panels in said stowed position.

5. A stowable ramp assembly as set forth in claim 4 wherein each of said plurality of panels includes a textured loading surface providing traction thereupon.

6. A tailgate assembly extending between spaced apart and generally parallel side walls of a storage area of a vehicle, said tailgate assembly comprising:

a tailgate having a hinge interconnecting said tailgate and the vehicle for providing pivotal movement of said tailgate between a closed position and an open position;

a plurality of panels extending from said tailgate in said open position, each of said plurality of panels extending between opposite first and second terminal ends and spaced apart, parallel longitudinal sides;

a plurality of hinges interconnecting adjacent terminal ends of said plurality of panels for providing hinged motion therebetween wherein said panels are collapsible onto each other to a stowed position against said tailgate; and a plurality of stiffener rails having a C-shaped cross-section engagable around said longitudinal sides of each of said panels for preventing relative motion between said plurality of panels.

7. A tailgate assembly as set forth in claim 6 including a stowable hinge interconnecting said first terminal end of one of said plurality of panels and said tailgate for providing hinged motion between said stowed position against said tailgate and an extended position.

8. A tailgate assembly as set forth in claim 7 including a ramp retainer bracket removably mounted to said tailgate for engaging and maintaining said plurality of panels in said stowed position.

* * * * *